United States Patent
Colclough

(10) Patent No.: US 8,234,021 B2
(45) Date of Patent: Jul. 31, 2012

(54) SYNTHETIC INSTRUMENT LANDING SYSTEM

(75) Inventor: John C. Colclough, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 1029 days.

(21) Appl. No.: 11/765,783

(22) Filed: Jun. 20, 2007

(65) Prior Publication Data

US 2008/0319592 A1    Dec. 25, 2008

(51) Int. Cl.
*G06F 19/00* (2011.01)
(52) U.S. Cl. .............................. 701/16; 342/34; 340/951
(58) Field of Classification Search ................ 701/3, 16, 701/18, 200, 201, 206–211, 302
See application file for complete search history.

(56) References Cited

U.S. PATENT DOCUMENTS

| | | | |
|---|---|---|---|
| 3,131,018 A * | 4/1964 | Brodzinsky et al. | 342/34 |
| 4,415,974 A * | 11/1983 | Laug et al. | 701/70 |
| 4,814,994 A * | 3/1989 | Doane et al. | 701/300 |
| 5,000,404 A * | 3/1991 | Martorella | 244/188 |
| 5,235,513 A * | 8/1993 | Velger et al. | 701/16 |
| 5,287,104 A * | 2/1994 | Shemwell | 340/952 |
| 5,991,691 A * | 11/1999 | Johnson | 701/214 |
| 6,064,924 A * | 5/2000 | Fleischmann | 701/16 |
| 6,119,055 A * | 9/2000 | Richman | 701/16 |
| 6,259,975 B1 * | 7/2001 | Rollet et al. | 701/3 |
| 6,317,663 B1 * | 11/2001 | Meunier et al. | 701/16 |
| 6,718,236 B1 * | 4/2004 | Hammer et al. | 701/3 |
| 2004/0044446 A1* | 3/2004 | Staggs | 701/16 |
| 2005/0033489 A1* | 2/2005 | Tezuka | 701/16 |
| 2006/0074558 A1* | 4/2006 | Williamson et al. | 701/213 |
| 2007/0021878 A1* | 1/2007 | Builta et al. | 701/7 |
| 2007/0158498 A1* | 7/2007 | Snediker | 244/110 F |

* cited by examiner

Primary Examiner — Helal A Algahaim
(74) Attorney, Agent, or Firm — Fogg & Powers LLC

(57) ABSTRACT

Systems and methods for generating approach information for a first vehicle approaching a second dynamic vehicle. An example method determines motion information of the second vehicle and generates approach information based on the determined motion information and the approach centerline. The method generates at least one of an approach path or a plurality of approach path reference points based on at least one of a center of motion of the second vehicle or a touchdown point on the second vehicle and generates at least one of a synthetic path or a plurality of synthetic path reference points by filtering the generated at least one approach path or plurality of approach path reference points.

9 Claims, 5 Drawing Sheets

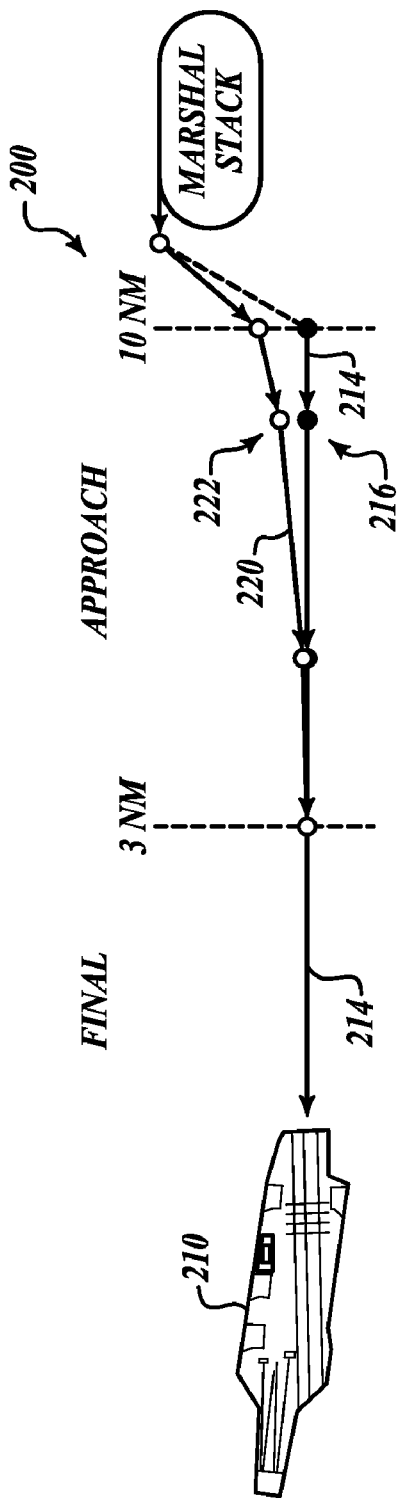
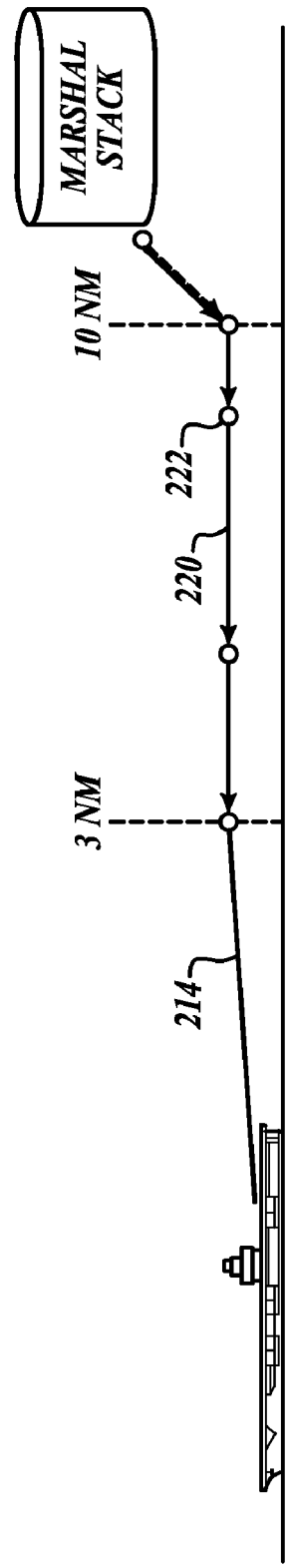

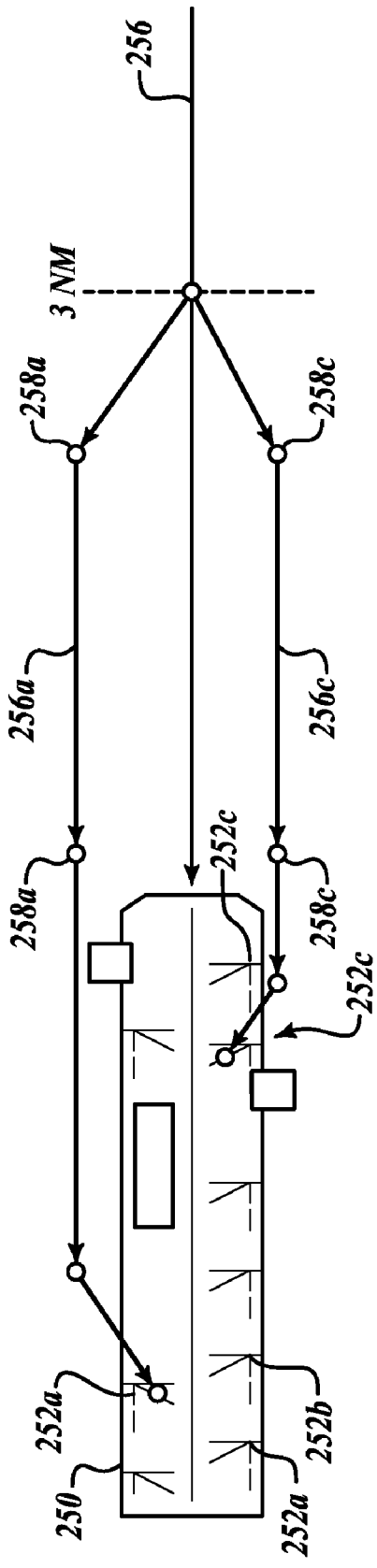
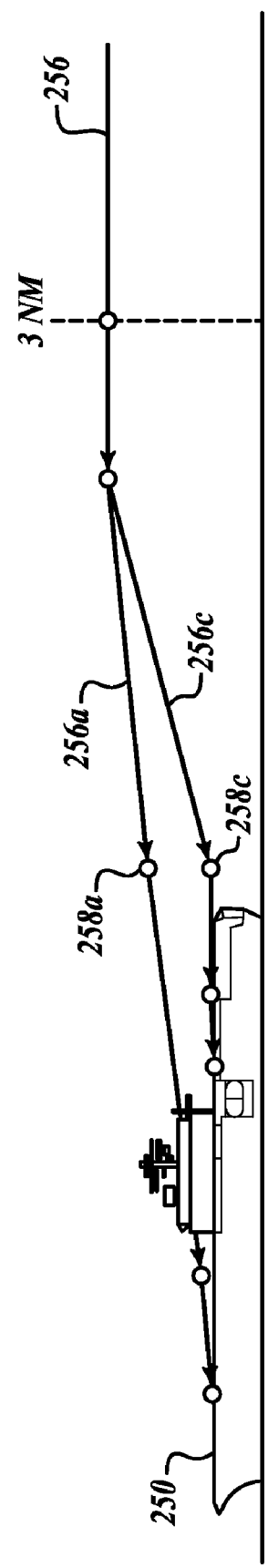

ated relative to the dynamic vehicle 28. At a block 106, a
SYNTHETIC INSTRUMENT LANDING SYSTEM

BACKGROUND OF THE INVENTION

Landing a vehicle onto a dynamic vehicle, such as an aircraft carrier, requires some respect for dynamics that do not exist when the landing is performed onto a stable environment, such as ground or a building. Some systems presently provide for flight deck motion compensation when an approaching aircraft is close to the aircraft carrier. However, at range the system still provides navigation relative to a reference landing beam that varies to a great extent when the dynamic vehicle is experiencing motion. For example, when the carrier is changing heading and an aircraft is on approach, the reference landing beam skews by a great amount thereby causing any aircraft at distance to perform quite dynamic maneuvers to get back to the centerline of the touchdown point.

SUMMARY OF THE INVENTION

The present invention provides systems and methods for generating approach information for a first vehicle approaching a second dynamic vehicle. An example method determines motion information of the second vehicle and generates approach information based on the determined motion information and the approach centerline.

In one aspect of the invention, the method generates at least one of an approach path or a plurality of approach path reference points based on at least one of a center of motion of the second vehicle or a touchdown point on the second vehicle and generates at least one of a synthetic path or a plurality of synthetic path reference points by filtering the generated at least one approach path or plurality of approach path reference points.

In another aspect of the invention, navigation signals are generated based on one of the generated synthetic path or plurality of reference points In still another aspect of the invention, filtering includes damping out variations of the at least one approach path or plurality of approach path reference points.

In yet another aspect of the invention, the second vehicle is a ship and the first vehicle is an aircraft. The ship includes a plurality of touchdown points.

BRIEF DESCRIPTION OF THE DRAWINGS

Preferred and alternative embodiments of the present invention are described in detail below with reference to the following drawings:

FIGS. 3A and 3B illustrate top view and side views of approach information formed in accordance with an embodiment of the present invention;

FIGS. 4A and 4B illustrate top and side views of an alternate embodiment of the present invention.

DETAILED DESCRIPTION OF THE PREFERRED EMBODIMENT

Figure 1:
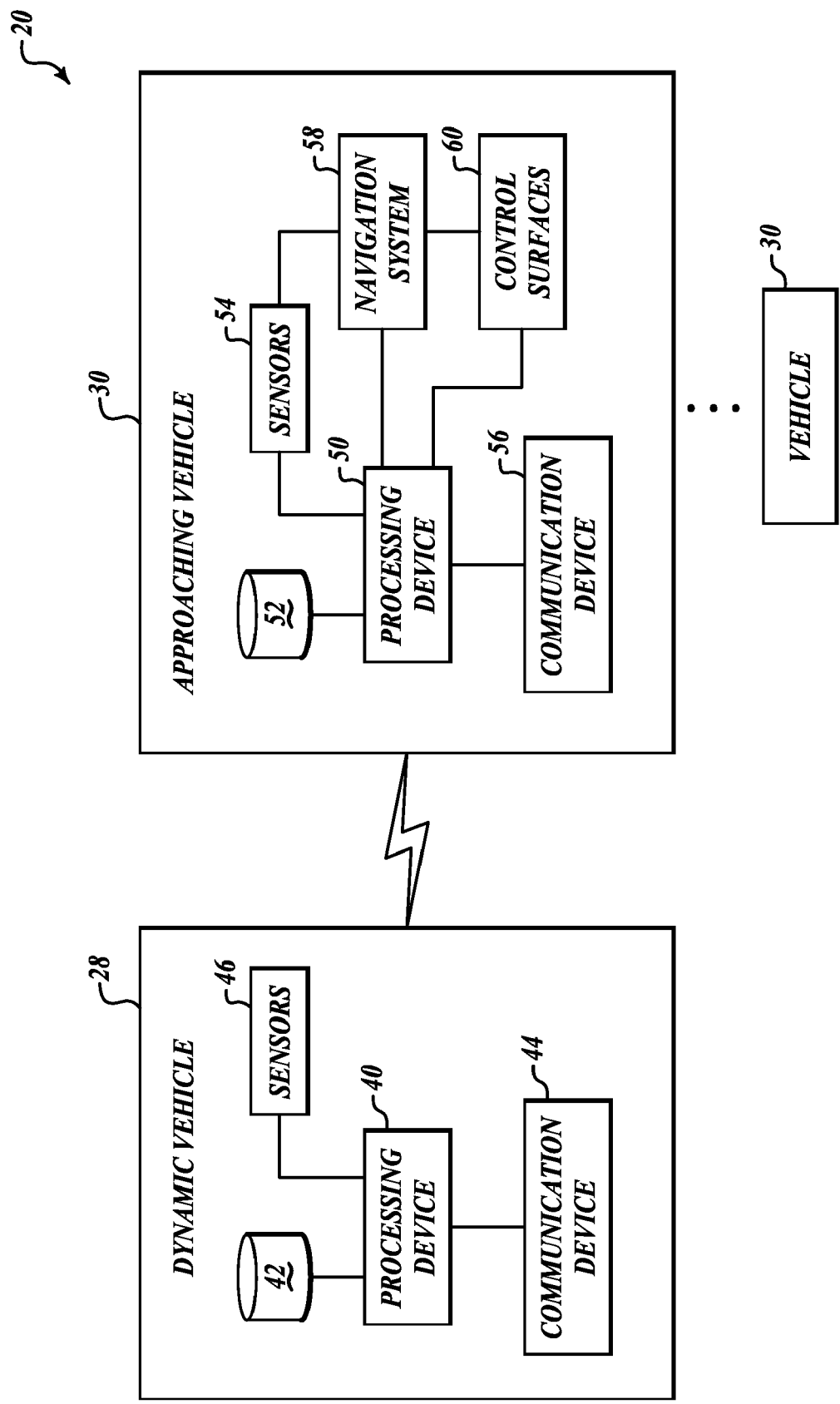
FIG. 1 illustrates a block diagram of an example system formed in accordance with an embodiment of the present invention.

FIG. 1 illustrates an example system 20 that provides approach guidance information. The system 20 includes a dynamic vehicle 28 that is in data communication with a plurality of approaching vehicles 30. The dynamic vehicle 28 is any of a number of moving vehicles, such as land, sea (e.g. aircraft carrier, subsurface vehicle) and space vehicle.

The dynamic vehicle 28 includes a processing device 40 that is in data communication with a database 42 and a communication device 44. The approaching vehicles 30 include a processing device 50 that is in data communication with database 52, a communication device 56, a navigation system 58, and control surfaces 60. The control surfaces 60 may optionally be in data communication with the navigation system 58 or can be in direct data communication with both the processing device 50 and the navigation system 58.

The dynamic vehicle 28 also includes sensors 46 for supplying the processing device 40 with motion information of the dynamic vehicle 28. The approaching vehicle 28 includes sensors 54 that provide aircraft positional information to either one of or both the processing device 50 and the navigation system 58.

In one embodiment, the processing device 40 of the dynamic vehicle 28 generates a multi-segmented synthetic approach path based on information stored in the database 42 and/or received from the sensors 46. The determined synthetic approach path is then wirelessly communicated to the approaching vehicle 30 via the communication device 44. In another embodiment, the dynamic vehicle 28 communicates motion information generated by the sensors 46 and/or information stored in the database 42 to the approaching vehicle 30 and the approaching vehicle 30 generates the synthetic approach path based on the received information and/or information stored in the local database 52.

When the approaching vehicle 30 either receives the synthetic path information via the communication device 56 or generates the synthetic path information, either the processing device 50 or navigation system 58 outputs navigation information, such as in the form of approach crosshair (e.g. Instrument Landing System (ILS) crosshairs), or controls operation of the control surfaces 60 (e.g. autopilot) according to the received or generated synthetic path. Navigation performed by an autopilot can be accomplished by navigating relative to glideslope and alignment information associated with the synthetic approach path or by navigating between reference points (i.e., waypoints) included in the synthetic approach path.

Figure 2:
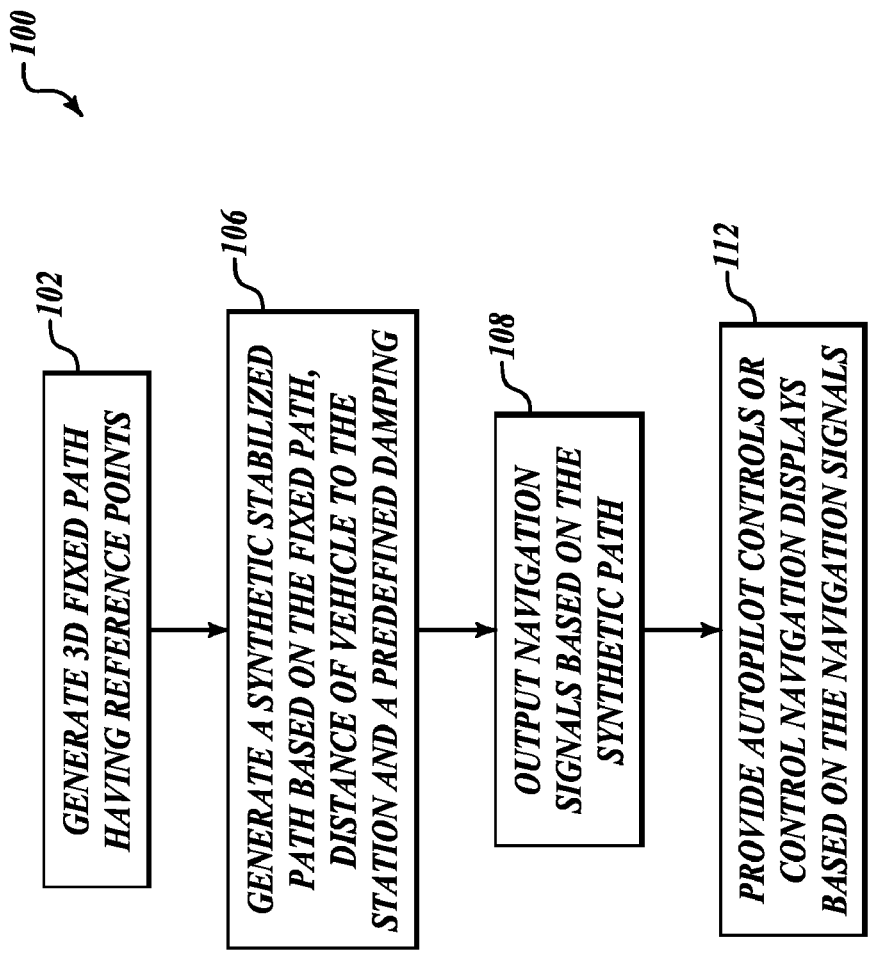
FIG. 2 illustrates an example process performed by the system shown in FIG. 1.

FIG. 2 illustrates an example process 100 performed by the system 20 shown in FIG. 1. First, at a block 102 a three-dimensional (3-D) fixed path having reference points is generated relative to the dynamic vehicle 28. At a block 106, a synthetic stabilized path is generated based on the fixed path and dynamic vehicle motion information. The synthetic path is a dampened version of the fixed path. Next, at a block 108, navigation signals are generated and outputted based on the generated synthetic path. At a block 112, autopilot controls are provided and/or navigation displays are controlled based on the outputted navigation signals.

Figure 3C:
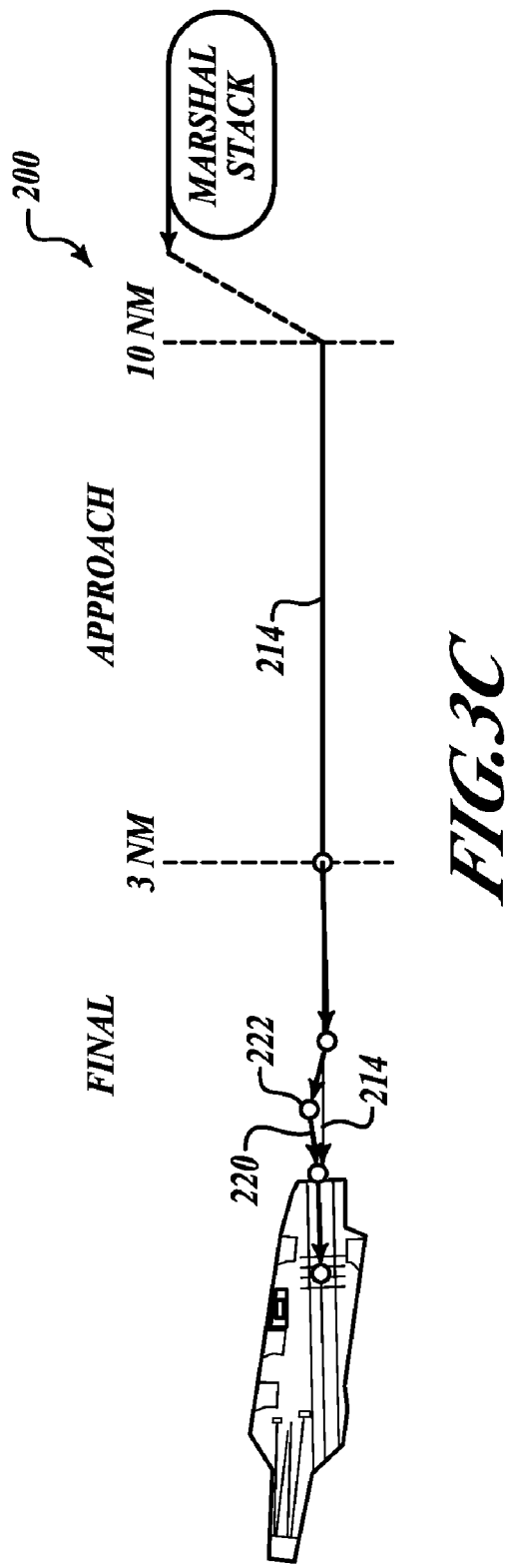
FIGS. 3C and 3D illustrate top view and side views of final approach information formed in accordance with an embodiment of the present invention.

FIGS. 3A-D illustrate top and side views of the present invention described above that is used in generating navigation signal information for approach to landing on a aircraft carrier 210 in both approach and final segments. In this embodiment, the approach segment is defined as the portion of an approach to landing greater than three nautical miles (NM). The final segment is the approach from 3 NM to touchdown. FIGS. 3A and 3B are top and side views of approach navigation information generated by both the prior art and the present invention in the approach segment. The prior art generates a fixed reference landing beam 214 that extends away from the centerline of the touchdown area of the aircraft carrier 210. The reference landing beam 214 is comprised of reference points 216 that is shown visually connected by lines. As the heading of the aircraft carrier 210 moves even slightly, the fixed reference landing beam 214 generates large distance swings in the approach segment. In accordance with the present invention, a synthetic stabilized landing beam 220 is generated. The synthetic stabilized landing beam 220 is comprised of damped reference points 222 and lines that link the points 222. The synthetic landing beam 220, if viewable by a pilot, would appear to be stable in space while the aircraft carrier 210 is in motion. The synthetic landing beam and the reference points 222 are calculated according to a damping technique, such as "lag filter" damping or lead prediction of the reference landing beam 214. The number of reference points 222 generated can vary depending upon system designer's/operator's choice. In one embodiment, the three-dimensional position of the reference points 222 are generated and used by the systems of the aircraft when presenting either navigational information for use in navigational displays or for use in automatic controls.

As shown in FIG. 3B, the altitude value for the synthetic landing beam 220 and reference points 222 is stable because it is associated with sea level. Therefore, what the aircraft experiences during the approach segment is damped-out navigation information that compensates for horizontal movements of the aircraft carrier 210 while also rounding out large changes in heading of the aircraft carrier 210. The greater the distance the aircraft is from the aircraft carrier 210 the more damping of the dramatic changes of the reference landing beam 214.

Figure 3D:
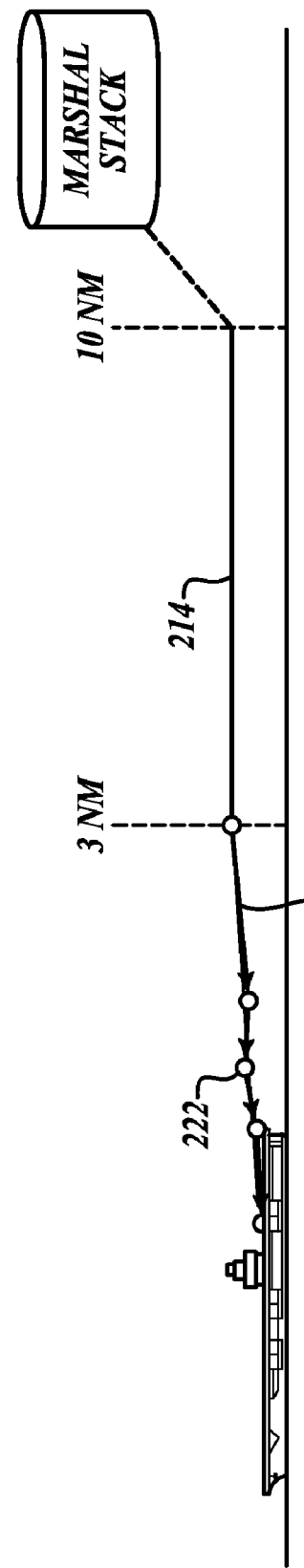

FIGS. 3C and 3D illustrate top and side views of the environment 200 when a synthetic landing beam 220 is determined in the final segment of an approach. In the final segment of the approach, the stabilized path is determined relative to a touchdown point on the carrier 210 with an inclusion of deck motion compensation. In the final segment, the synthetic path is damped relative to the motion of the centerline of the canted deck of the carrier 210 and the touchdown point. The closer to the touchdown point the less will be the damping of the synthetic path. Deck motion compensation is also used to generate the final synthetic path that may include lead compensation to estimate the position of the touch down point at the instance of landing. Examples of deck motion compensation algorithms are used in coupled approach systems that are presently being used with the F/A-18.

FIGS. 4A and 4B illustrate an alternate embodiment of the present invention. A dynamic vehicle, such a helicopter carrier 250 (such as an Landing, Helicopter, Assault (LHA) ship), includes multiple landing pads 252a-c (static reference points). If a selection is made as to which landing pad an approaching aircraft is to land at, then during the final segment of flight, the synthetic approach path 256 is altered according to the selected landing position. Also, reference points for the newly created synthetic path are generated (see synthetic path 256a, c and reference points 258a, 258c). The reference points 258a, 258c are selected in order to comply with regard to a published approach, such as Carrier Vessel Nuclear (CVN) and LHA approaches.

In one embodiment, stabilized or synthetic path reference points are broadcasted at a generally low broadcast rate of 1 typically 1 Hz to the approaching vehicle 30 when the vehicle 30 is within the approach segment. But when the approaching vehicle 30 is in the final segment of an approach, the reference points are transmitted at a higher rate to the vehicle 30. The higher rate will be dependant on the dynamics of the carrier 250 and the capabilities of the vehicle 30. Typical rates for the final segment would be between 10 and 20 Hz, other rates may be used.

In one embodiment the data link between the dynamic vehicle 28 and the approaching vehicle 30 is a bidirectional transmission information between vehicles.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A system for generating approach information for a first vehicle approaching a second vehicle, the second vehicle having an approach centerline, the system comprising:
  a first component configured to determine motion information of the second vehicle; and
  a second component configured to generate a stabilized landing beam comprised of damped reference points based on the determined motion information and the approach centerline, wherein the damped reference points adaptably reference the determined motion information of the second vehicle.

2. The system of claim 1, wherein the second component comprises:
  a component configured to generate a plurality of approach path reference points based on at least one of a center of motion of the second vehicle or a touchdown point on the second vehicle; and
  a component configured to generate a plurality of damped reference points by filtering the plurality of approach path reference points.

3. The system of claim 2, further comprising a third component configured to generate navigation signals based on the plurality of damped reference points.

4. The system of claim 3, wherein the third component dampens out variations of the plurality of approach path reference points.

5. The system of claim 4, wherein the plurality of approach path reference points determines a final approach segment based on the touchdown point.

6. The system of claim 4, wherein the first and second components are located on the second vehicle.

7. The system of claim 4, wherein the first component is located on the second vehicle and the second component is located on the first vehicle.

8. The system of claim 2, wherein the second vehicle is a ship and the first vehicle is an aircraft.

9. The system of claim 8, wherein the ship includes a plurality of touchdown points.

* * * * *